United States Patent
Ryu (10) Patent No.: US 10,808,780 B2
(45) Date of Patent: Oct. 20, 2020

(54) CALIPER FOR VEHICLE BRAKE

(71) Applicant: HYUNDAI MOBIS CO., LTD., Seoul (KR)

(72) Inventor: Sang Hyup Ryu, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 36 days.

(21) Appl. No.: 16/109,685

(22) Filed: Aug. 22, 2018

(65) Prior Publication Data

US 2019/0063522 A1 Feb. 28, 2019

(30) Foreign Application Priority Data

Aug. 23, 2017 (KR) .................. 10-2017-0106452

(51) Int. Cl.

| | |
|---|---|
| *F16D 65/02* | (2006.01) |
| *F16D 65/00* | (2006.01) |
| *F16D 55/226* | (2006.01) |
| *F16D 55/2265* | (2006.01) |
| *F16D 55/00* | (2006.01) |

(52) U.S. Cl.
CPC ..... *F16D 65/0075* (2013.01); *F16D 55/2262* (2013.01); *F16D 65/0068* (2013.01); *F16D 65/0081* (2013.01); *F16D 65/02* (2013.01); *F16D 55/2265* (2013.01); *F16D 2055/002* (2013.01); *F16D 2055/0037* (2013.01)

(58) Field of Classification Search
CPC .......................... F16D 65/0081; F16D 65/0971
See application file for complete search history.

(56) References Cited

U.S. PATENT DOCUMENTS

| | | | |
|---|---|---|---|
| 2004/0074716 A1 * | 4/2004 | Brumfield | F16D 55/22 188/218 A |
| 2009/0152056 A1 * | 6/2009 | Heinz | F16D 65/097 188/72.5 |

(Continued)

FOREIGN PATENT DOCUMENTS

| | | | | |
|---|---|---|---|---|
| DE | 4101514 A1 * | 7/1992 | ............. | F16D 55/00 |
| DE | 102016100536 A1 * | 7/2017 | ......... | F16D 65/0075 |

(Continued)

OTHER PUBLICATIONS

Machine translation of DE 4101514, retrieved Nov. 2019 (Year: 2019).*

(Continued)

*Primary Examiner* — Bradley T King
(74) *Attorney, Agent, or Firm* — H.C. Park & Associates (57) ABSTRACT

A caliper for a vehicle brake may include: a caliper body assembly coupled to a torque cover having a friction pad installed therein, and having a first installation groove and a coupling groove connected to the first installation groove; a plate disposed so as to face the caliper body assembly, and including a second installation insertion coupled to the first installation groove and having a first coupling hole facing the coupling groove; a spacer disposed between the caliper body assembly and the plate, maintaining a gap between the caliper body assembly and the plate using an elastic force, and having a second coupling hole facing the first coupling hole; and a fastener coupled to the coupling groove through the second coupling hole and the first coupling hole.

5 Claims, 8 Drawing Sheets

(56) References Cited

U.S. PATENT DOCUMENTS

| | | | |
|---|---|---|---|
| 2010/0163350 A1* | 7/2010 | Bach | F16D 55/226 |
| | | | 188/73.43 |
| 2013/0291418 A1* | 11/2013 | Mallmann | F16D 55/02 |
| | | | 40/666 |
| 2015/0260244 A1* | 9/2015 | Maehara | F16D 65/0087 |
| | | | 188/72.4 |
| 2018/0010656 A1* | 1/2018 | Barland | F16D 65/0081 |
| 2018/0045257 A1* | 2/2018 | Eash | F16D 65/0081 |
| 2018/0080512 A1* | 3/2018 | Barland | F16D 65/0087 |
| 2018/0231076 A1* | 8/2018 | Choi | F16D 65/0068 |
| 2018/0328428 A1* | 11/2018 | Ryu | F16D 65/0006 |

FOREIGN PATENT DOCUMENTS

| | | | |
|---|---|---|---|
| JP | 2013108548 A * | 6/2013 | |
| KR | 10-2011-0140004 | 12/2011 | |

OTHER PUBLICATIONS

Machine translation of JP 2013-108548, retrieved Jun. 8, 2020 (Year: 2020).*

* cited by examiner

CALIPER FOR VEHICLE BRAKE

CROSS-REFERENCES TO RELATED APPLICATION

The application claims priority from and the benefit of Korean Patent Application No. 10-2017-0106452, filed on Aug. 23, 2017, which is hereby incorporated by reference for all purposes as if set forth herein.

BACKGROUND

Field

Exemplary embodiments relate to a caliper for a vehicle brake, and more particularly, to a caliper for a vehicle brake, which has an improved exterior quality, and can prevent a motion and separation of a plate.

Discussion of the Background

In general, a brake uses a caliper having a pair of friction pads to strongly press a disk from both sides, the disk being rotated with a wheel. Such a caliper is coupled to a plate having an emblem printed thereon, the emblem containing manufacturer information of the brake. Depending on vibration of the vehicle, the plate may be moved to cause noise or loosen the coupling. Therefore, there is a demand for a device capable of solving the problem.

The related art is disclosed in Korean Patent Publication No. 2011-0140004 published on Dec. 30, 2011 and entitled "Caliper for parking brake of vehicle".

The above information disclosed in this Background section is only for enhancement of understanding of the background of the invention and, therefore, it may contain information that does not constitute prior art.

SUMMARY

Exemplary embodiments of the present invention are directed to a caliper for a vehicle brake, which has an improved exterior quality, and can prevent a motion and separation of a plate.

In one embodiment, a caliper for a vehicle brake may include: a caliper body assembly coupled to a torque cover having a friction pad installed therein, and having a first installation groove and a coupling groove connected to the first installation groove; a plate disposed so as to face the caliper body assembly, and including a second installation insertion coupled to the first installation groove and having a first coupling hole facing the coupling groove; a spacer disposed between the caliper body assembly and the plate, maintaining a gap between the caliper body assembly and the plate using an elastic force, and having a second coupling hole facing the first coupling hole; and a fastener coupled to the coupling groove through the second coupling hole and the first coupling hole.

The caliper body assembly may include: a caliper body coupled to the torque cover; and a first installation cover bent and extended from the caliper body so as to face the plate, and having the first installation groove to which the second installation insertion is coupled and the coupling groove connected to the first installation groove.

The plate may include: a plate body disposed so as to face the first installation cover; and the second installation insertion protruded from the plate body so as to be coupled to the first installation groove, and having the first coupling hole facing the coupling groove.

The first installation groove may have an installation protrusion formed toward the inside, and the bottom of the second installation insertion may be brought in contact with the installation protrusion.

The maximum inner width of the first installation groove may be equal to the maximum outer width of the second installation insertion.

Any one of the first installation groove and the second installation insertion may have a fastening groove formed therein, and the other of the first installation groove and the second installation insertion may have a fastening protrusion inserted into the fastening groove.

The fastening protrusion may be slid and coupled along the fastening groove.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF ILLUSTRATED EMBODIMENTS

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Hereafter, a caliper for a vehicle brake in accordance with an embodiment of the present invention will be described in detail with reference to the accompanying drawings.

It should be noted that the drawings are not to precise scale and may be exaggerated in thickness of lines or sizes of components for descriptive convenience and clarity only. Furthermore, the terms as used herein are defined by taking functions of the invention into account and can be changed according to the custom or intention of users or operators. Therefore, definition of the terms should be made according to the overall disclosures set forth herein.

Figure 1:
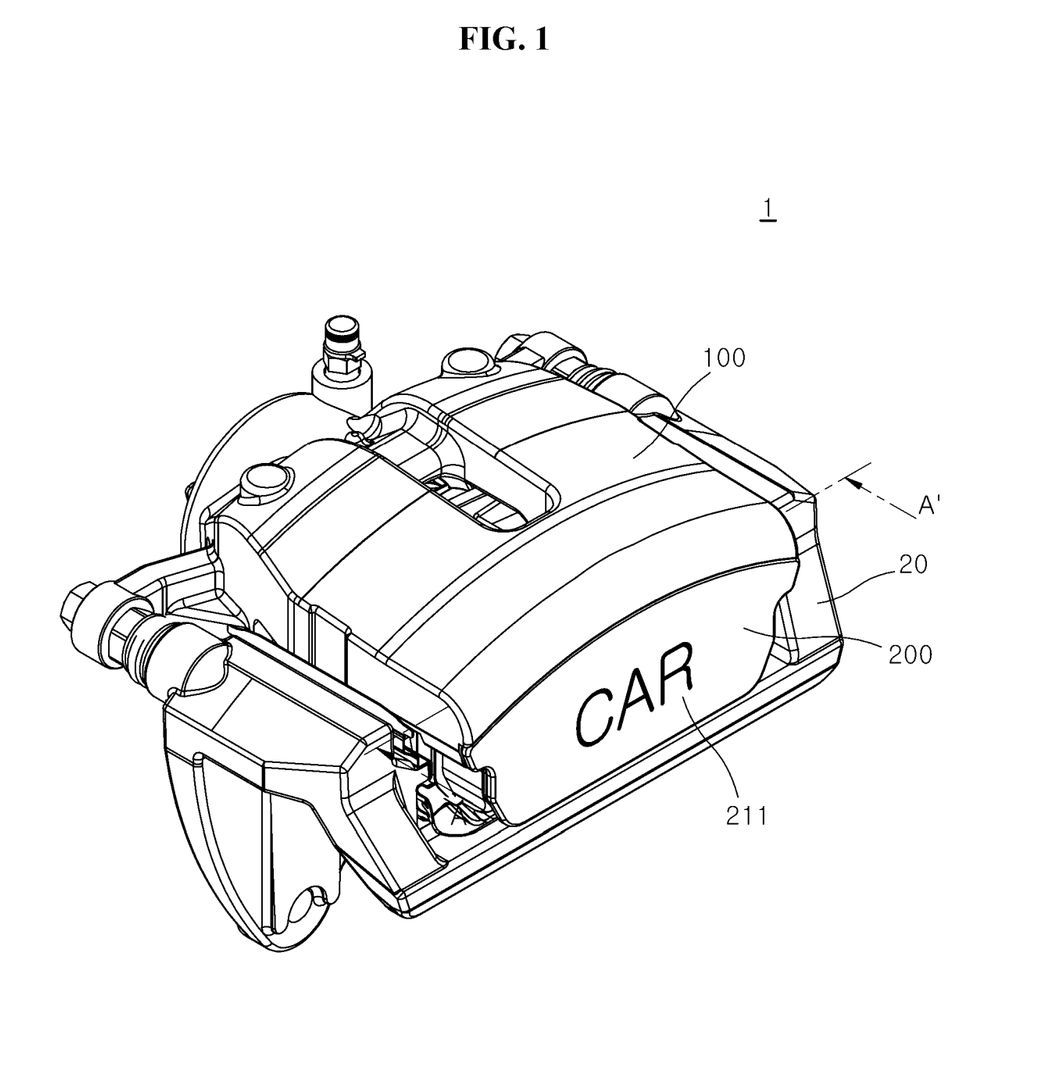
FIG. 1 is a perspective view illustrating a caliper for a vehicle brake in accordance with an embodiment of the present invention.
Figure 2:
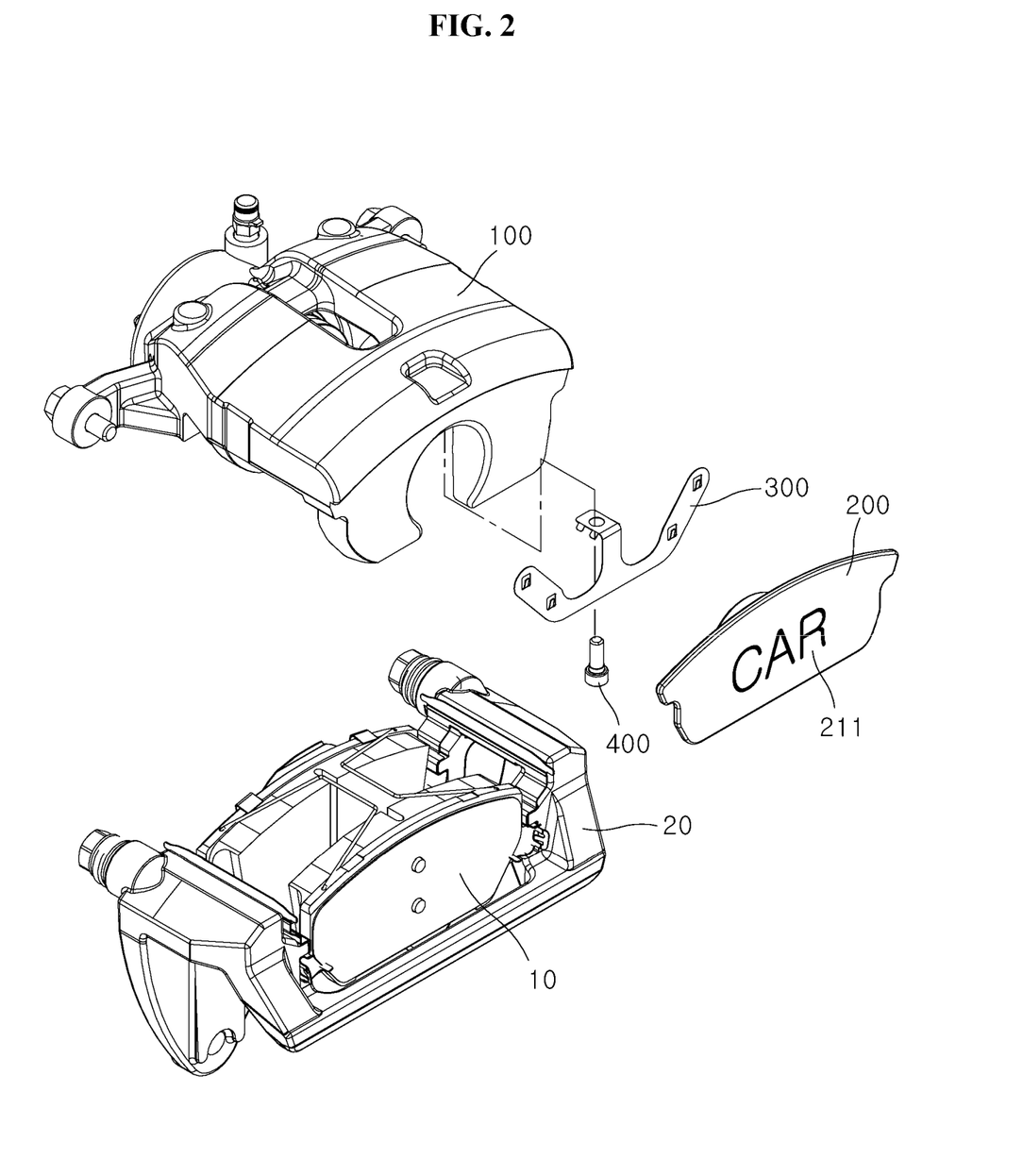
FIG. 2 is an exploded perspective view illustrating a caliper for a vehicle brake in accordance with a first embodiment of the present invention.
Figure 3:
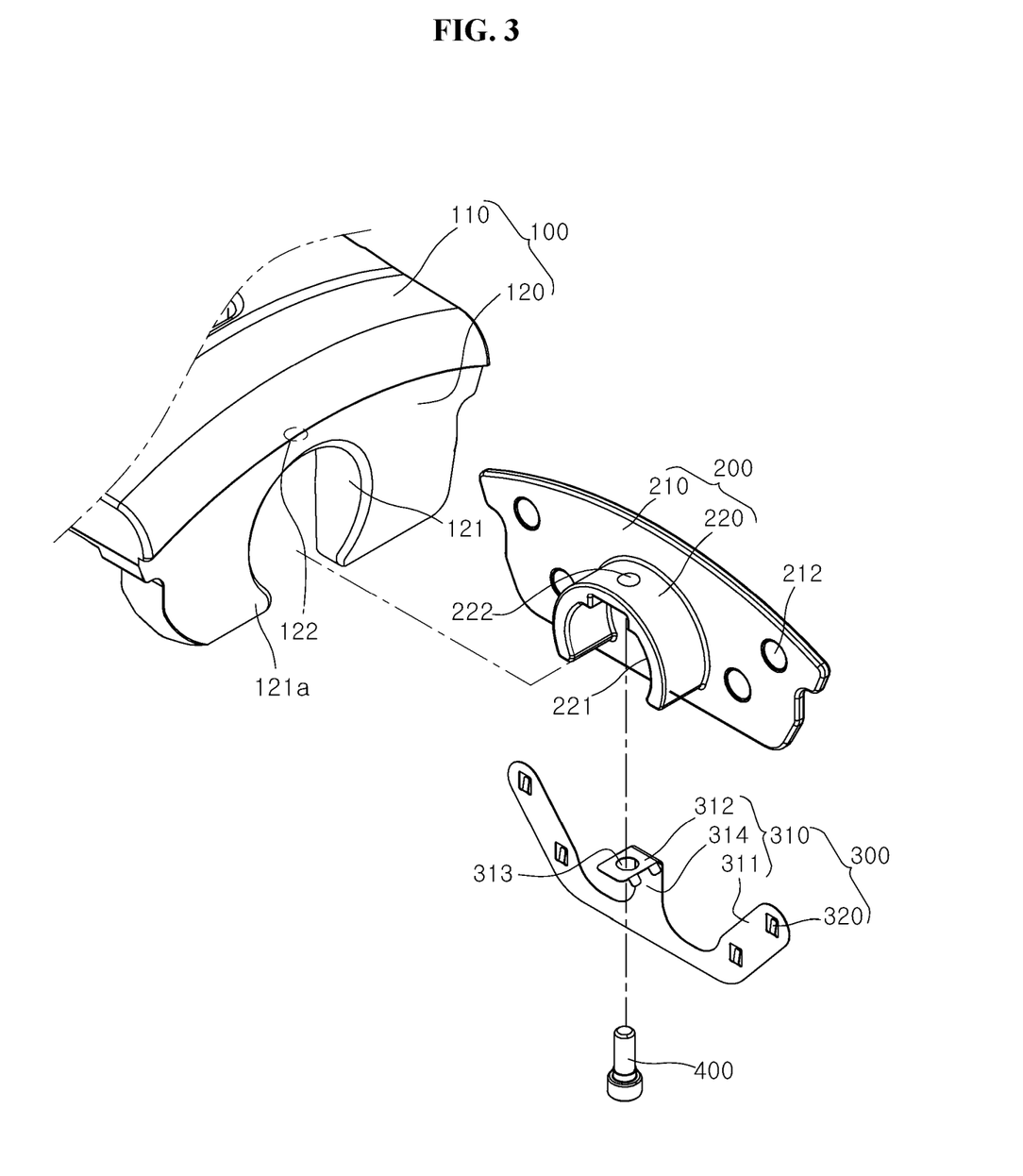
FIG. 3 is an exploded perspective view illustrating main parts of the caliper for a vehicle brake in accordance with the first embodiment of the present invention.
Figure 4:
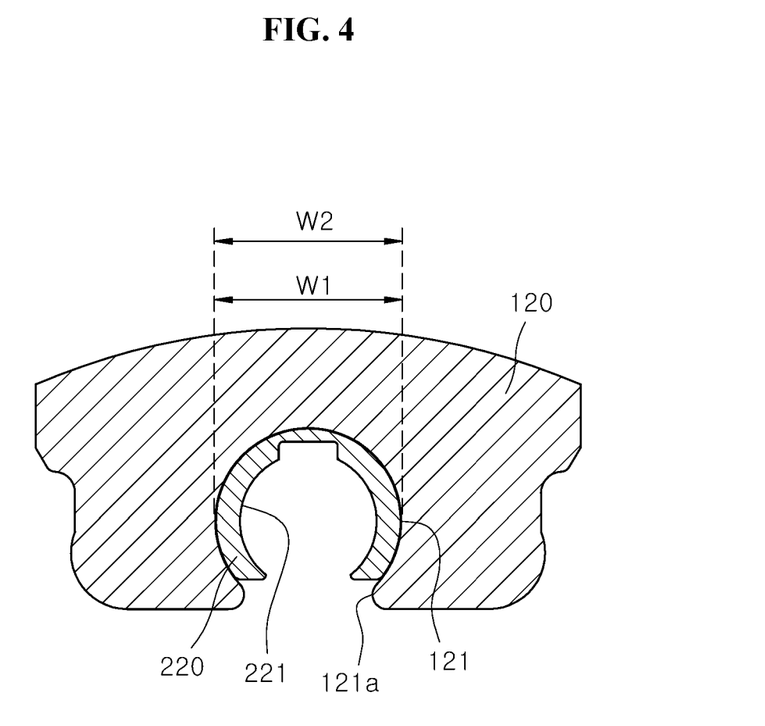
FIG. 4 is a cross-sectional view taken along the line A-A' of FIG. 1 in accordance with the first embodiment of the present invention.
Figure 5:
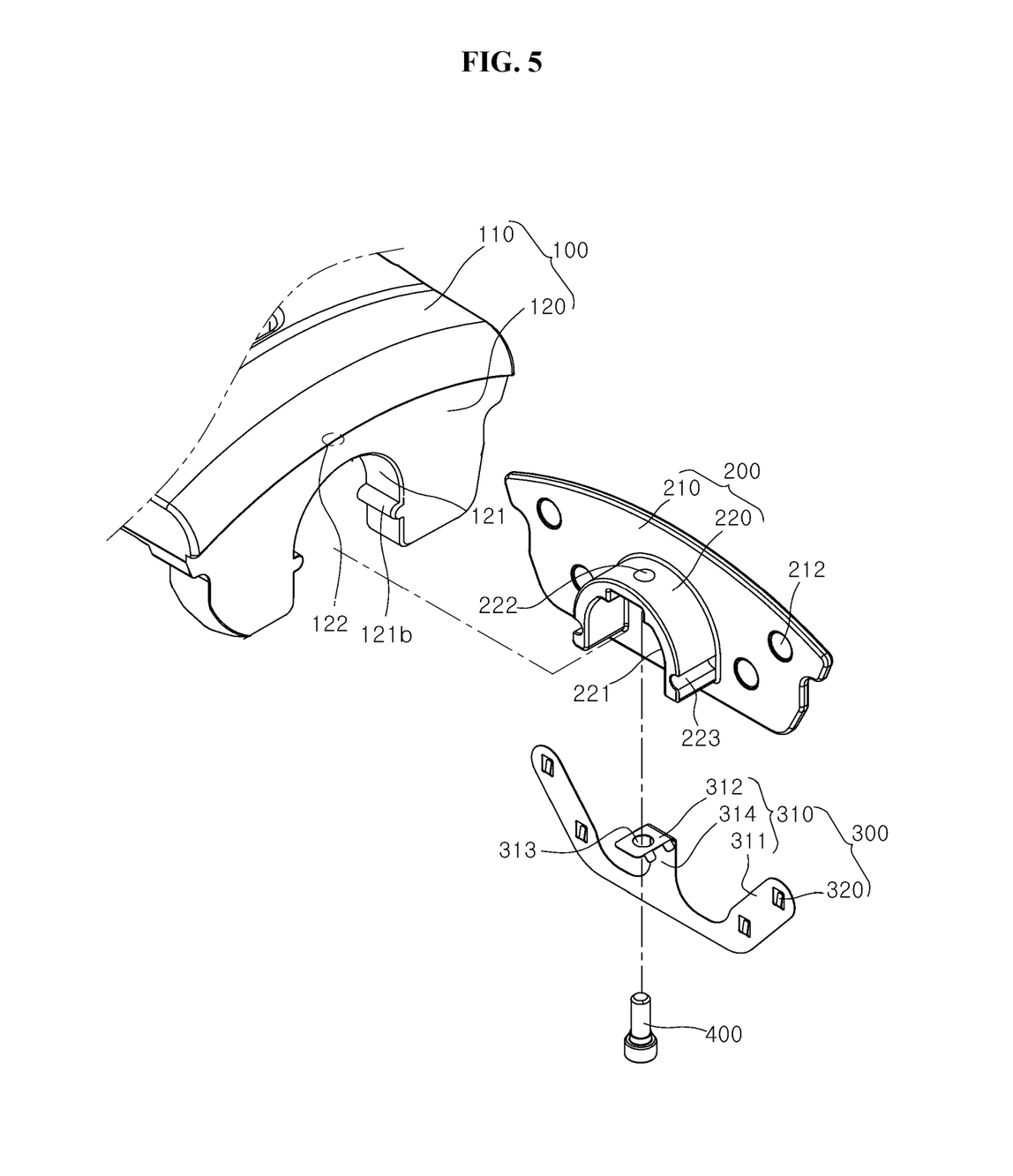
FIG. 5 is an exploded perspective view illustrating main parts of a caliper for a vehicle brake in accordance with a second embodiment of the present invention.
Figure 6:
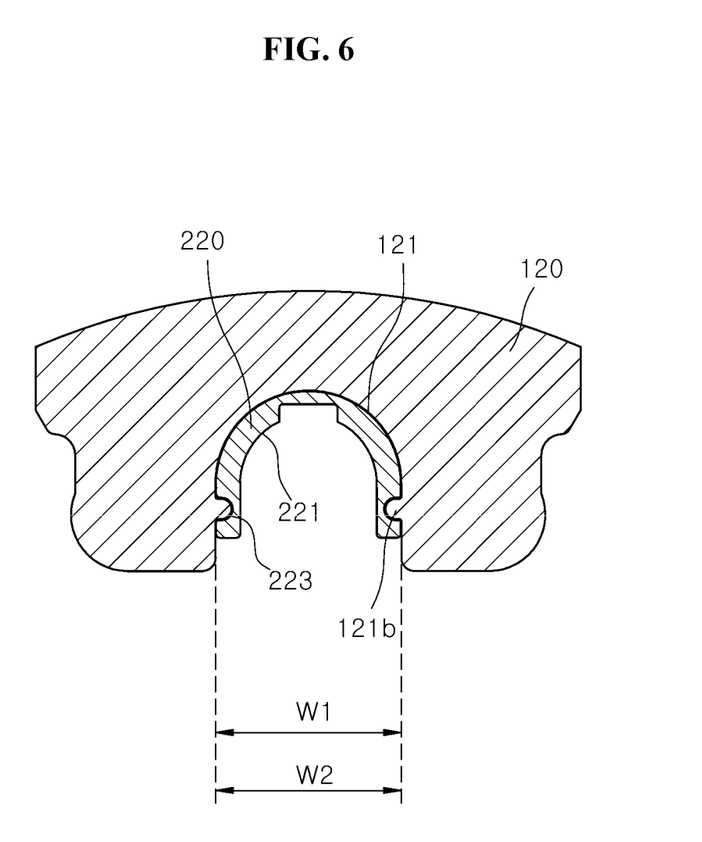
FIG. 6 is a cross-sectional view illustrating the caliper for a vehicle brake in accordance with the second embodiment of the present invention.
Figure 7:
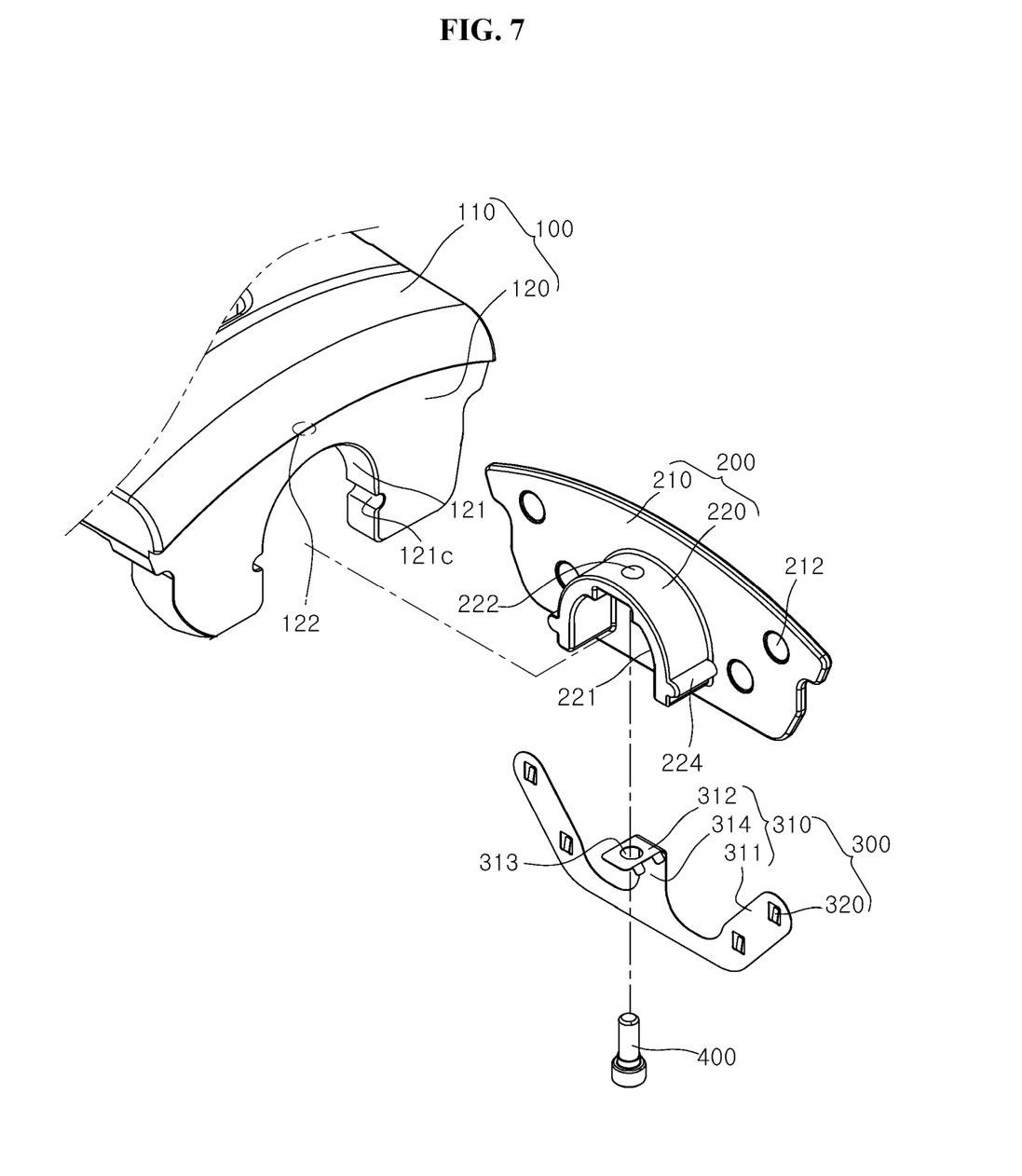
FIG. 7 is an exploded perspective view illustrating another example of the main parts of the caliper for a vehicle brake in accordance with the second embodiment of the present invention.
Figure 8:
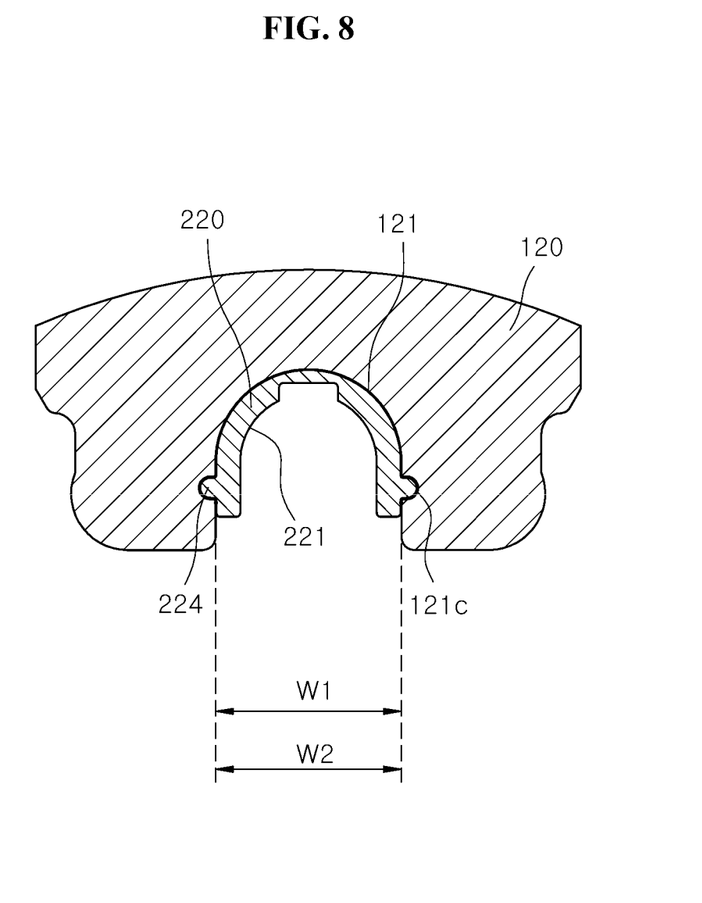
FIG. 8 is a cross-sectional view illustrating another example of the caliper for a vehicle brake in accordance with the second embodiment of the present invention.

FIG. 1 is a perspective view illustrating a caliper for a vehicle brake in accordance with an embodiment of the present invention, FIG. 2 is an exploded perspective view illustrating a caliper for a vehicle brake in accordance with a first embodiment of the present invention, FIG. 3 is an exploded perspective view illustrating main parts of the caliper for a vehicle brake in accordance with the first embodiment of the present invention, FIG. 4 is a cross-sectional view taken along the line A-A' of FIG. 1 in accordance with the first embodiment of the present invention, FIG. 5 is an exploded perspective view illustrating main parts of a caliper for a vehicle brake in accordance with a second embodiment of the present invention, FIG. 6 is a cross-sectional view illustrating the caliper for a vehicle brake in accordance with the second embodiment of the present invention, FIG. 7 is an exploded perspective view illustrating another example of the main parts of the caliper for a vehicle brake in accordance with the second embodiment of the present invention, and FIG. 8 is a cross-sectional view illustrating another example of the caliper for a vehicle brake in accordance with the second embodiment of the present invention.

Referring to FIGS. 1 to 4, the caliper 1 for a vehicle brake in accordance with the first embodiment of the present invention may include a caliper body assembly 100, a plate 200, a spacer 300 and a fastener 400.

The caliper body assembly 100 may be coupled to a torque cover 20 having a friction pad 10 installed therein. The caliper body assembly 100 may have a first installation groove 121 and a coupling groove 122 connected to the first installation groove 121. The torque cover 20 may serve to press the friction pad 10 against a wheel disk (not illustrated) in order to brake a vehicle.

The plate 200 may be disposed so as to face the caliper body assembly 100, and have vehicle information 211 printed thereon. The vehicle information 211 may include the emblem of a brake manufacturer. The plate 200 may include a second installation insertion 220 coupled to the first installation groove 121 and having a first coupling hole 222 formed therein, the first coupling hole 222 facing the coupling groove 122.

The spacer 300 may be disposed between the caliper body assembly 100 and the plate 200, and maintain a space between the caliper body assembly 100 and the plate 200 using its elastic restoring force. The spacer 300 may have a second coupling hole 313 facing the first coupling hole 222. The spacer 300 may be disposed in the form of as a plate spring between the caliper body assembly 100 and the plate 200, and prevent a contact between the caliper body assembly 100 and the plate 200, which may be caused by vibration generated during braking or driving of the vehicle. Thus, although vibration is generated during braking or driving of the vehicle, an occurrence of noise can be avoided while a contact between the caliper body assembly 100 and the plate 200 is prevented.

The spacer 300 may include first and second spacers 310 and 320. The first spacer 310 may be disposed between the caliper body assembly 100 and the plate 200. The second spacer 320 may be extended from the first spacer 310 toward one side.

The first spacer 310 may be brought in contact with any one of the caliper body assembly 100 and the plate 200. The second spacer 320 may be brought in contact with the other of the caliper body assembly 100 and the plate 200, and the first and second spacers 310 and 320 may elastically support the caliper body assembly 100 and the plate 200, respectively, so as to isolate the caliper body assembly 100 and the plate 200 from each other.

The first spacer 310 may include a first spacer body 311, a coupling piece 312 and a connection piece 314. The first spacer body 311 may include a plurality of second spacers 320 formed therein. The first spacer body 311 may be disposed in a plate shape between the caliper body assembly 100 and the plate 200. The plurality of second spacers 320 included in the first spacer body 311 may be extended toward the plate 200 so as to come in contact with the plate 200 (refer to FIG. 3).

Specifically, when the spacer 300 and the plate 200 are coupled to the caliper body assembly 100, the first and second spacers 310 and 320 may elastically support the caliper body assembly 100 and the plate 200, respectively. Therefore, the caliper body assembly 100 and the plate 200 may be isolated from each other by the spacer 300 and maintain a gap therebetween. Thus, since the caliper body assembly 100 and the plate 200 may not come in contact with each other even though vibration is generated during braking and driving of the vehicle, an occurrence of noise can be avoided while a contact between the caliper body assembly 100 and the plate 200 is prevented.

The coupling piece 312 may be formed in a plate shape, and the second coupling hole 313 may be formed at a position facing the first coupling hole 222 of the plate 200. The coupling piece 312 and the connection piece 314 may be inserted into the second installation groove 221, and the second coupling hole 313 may be disposed so as to face the first coupling hole 222. Therefore, the fastener 400 may be easily passed through the second coupling hole 313 and the first coupling hole 222, and coupled to the coupling groove 122. The connection piece 314 may be disposed between the first spacer body 311 and the coupling piece 312, and connect the first spacer body 311 and the coupling piece 312.

The first spacer body 311 may be vertically symmetrical with respect to the connection piece 314, and the plurality of second spacers 320 included in the first spacer body 311 may be disposed in the longitudinal direction (FIG. 3) so as to be separated from each other. Therefore, the spacer 300 may elastically support the caliper body assembly 100 and the plate 200 across the entire surfaces thereof.

The first spacer 310 may come in contact with the caliper body assembly 100, and the second spacer 320 may be extended toward the plate 200 so as to come in contact with the plate 200. Therefore, the caliper body assembly 100 and the plate 200 may be elastically supported by the spacer 300, such that a gap between the caliper body assembly 100 and the plate 200 can be maintained.

The plate 200 may include an insertion groove 212 in which the second spacer 320 is mounted. Therefore, when the first spacer 310 is disposed between the caliper body assembly 100 and the plate 200, the position of the second spacer 320 may be fixed while the second spacer 320 is inserted into the insertion groove 212. Therefore, although vibration is generated during braking or driving of the vehicle, the spacer 300 can be prevented from moving out of the preset space.

FIG. 3 illustrates that the plate 200 has the insertion groove 212 formed therein. However, the second spacer 320 may not be inserted into the insertion groove 212, but come in direct contact with the plate body 210 of the plate 200.

FIG. 3 illustrates that the first spacer 310 comes in contact with the caliper body assembly 100, and the second spacer 320 is extended toward the plate 200 and comes in contact with the plate 200. The present invention is not limited thereto, but a design change may be made in such a manner that the first spacer 310 comes in contact with the plate 200, and the second spacer 320 is extended toward the first spacer 310, and comes in contact with the caliper body assembly 100.

The caliper body assembly 100 may have the coupling groove 122 formed therein, and the plate 200 may include the second installation insertion 220 having the first coupling hole 222 formed at a position facing the coupling groove 122. Specifically, the coupling groove 122 may communicate with the first installation groove 121 formed in the first installation cover 120 of the caliper body assembly 100. The first coupling hole 222 may communicate with the second installation groove 221 formed in the second installation insertion 220 of the plate 200. That is, when the second installation insertion 220 of the plate 200 is inserted into the first installation groove 121 of the caliper body assembly 100, the coupling groove 122 and the first coupling hole 222 may be connected while facing each other.

The spacer 300 may have the second coupling hole 313 formed at a position facing the first coupling hole 222, and the fastener 400 may be coupled to the coupling groove 122 through the second coupling hole 313 and the first coupling hole 222. Specifically, the second coupling hole 313 may be formed in the coupling piece 312 of the spacer 300. When the spacer 300 is inserted into the second installation insertion 220 of the plate 200, the second coupling hole 313 and the first coupling hole 222 may be disposed so as to face each other, and connected as one hole. That is, the coupling groove 122, the first coupling hole 222 and the second coupling hole 313 are arranged in a line so as to be connected as one hole.

With the spacer 300 disposed between the caliper body assembly 100 and the plate 200, a bolt of the fastener 400 may be coupled to the coupling groove 122 of the caliper body assembly 100 through the second coupling hole 313 of the spacer 300 and the first coupling hole 222 of the plate 200. Therefore, the spacer 300, the plate 200 and the caliper body assembly 100 are coupled as one body.

In the caliper 1 for a vehicle brake in accordance with the present embodiment, when the caliper body assembly 100, the plate 200 and the spacer 300 are coupled, the spacer 300 may be installed into the second installation insertion 220 of the plate 200, with the second installation insertion 220 of the plate 200 coupled to the first installation groove 121 of the caliper body assembly 100. Then, the caliper body assembly 100, the plate 200 and the spacer 300 may be coupled as one body through the fastener 400. At this time, when the caliper body assembly 100, the plate 200 and the spacer 300 are coupled, the coupling portions are not seen from outside, which makes it possible to improve the exterior quality of the caliper 1 for a vehicle brake.

As illustrated in FIGS. 3 and 4, the caliper body assembly 100 may include a caliper body 110 and a first installation cover 120. The caliper body 110 may be coupled to the torque cover 20. The first installation cover 120 may be bent and extended from the caliper body 110 so as to face the plate 200, and have the first installation groove 121 to which the second installation insertion 220 is coupled. At this time, the first installation groove 121 may be formed in a shape corresponding to the second installation insertion 220 of the plate 200. Thus, the plate 200 may be coupled to the caliper body assembly 100 while being in contact with the caliper body assembly 100. The first installation cover 120 may include the coupling groove 122 connected to the first installation groove 121.

The plate 200 may include the plate body 210 and the second installation insertion 220. The plate body 210 may be disposed so as to face the first installation cover 120. The second installation insertion 220 may be protruded from the plate body 210 and coupled to the first installation groove 121. The second installation insertion 220 may have the first coupling hole 222 facing the coupling groove 122. Specifically, the second installation insertion 220 may have the second installation groove 221 into which the spacer 300 is inserted, and the first coupling hole 222 may be connected to the second installation groove 221.

The first installation groove 121 may have an installation protrusion 121a protruding toward the inside, and the bottom of the second installation insertion 220 may be brought in contact with the installation protrusion 121a. Specifically, the second installation insertion 220 may be slid and coupled to the first installation groove 121. When the second installation insertion 220 is slid and coupled to the first installation groove 121, the installation protrusion 121a of the first installation groove 121 may support the bottom surface of the second installation insertion 220. That is, the caliper body assembly 100 may support the bottom of the plate 200. As a result, when coupling the spacer 300 to the caliper body assembly 100 and the plate 200 using the fastener 400, an operator can easily couple the spacer 300 to the caliper body assembly 100 and the plate 200 without a separate device or worker to support the plate 200. Furthermore, although the fastener 400 is separated or loosened by vibration of the vehicle or the like, the plate 200 can be prevented from separating from the caliper body assembly 100.

The maximum inner width W1 of the first installation groove 121 may be equal to the outer width W2 of the second installation insertion 220. Therefore, when the caliper body assembly 100 and the plate 200 are coupled, no gap may be formed between the first installation groove 121 and the second installation insertion 220, which makes it possible to avoid a collision between the second installation insertion 220 and the first installation groove 121 while preventing the movement of the second installation insertion 220 due to vibration of the vehicle.

Hereafter, the operation and effect of the caliper 1 for a vehicle brake in accordance with the first embodiment of the present invention will be described with reference to FIGS. 3 and 4.

In order to couple the caliper body assembly 100, the plate 200 and the spacer 300 as one body, an operator may first couple the second installation insertion 220 of the plate 200 to the first installation groove 121 of the caliper body assembly 100.

Specifically, when the second installation insertion 220 of the plate 200 is slid and coupled to the first installation groove 121 of the caliper body assembly 100, the installation protrusion 121a of the first installation groove 121 may be brought in contact with the bottom of the second installation insertion 220 and support the second installation insertion 220. At this time, since the maximum inner width W1 of the first installation groove 121 is equal to the maximum outer width W2 of the second installation insertion 220, no gap is formed between the first installation groove 121 and the second installation insertion 220. As a result, it is possible to prevent noise which may occur when the second installation insertion 220 is moved to collide with the first installation groove 121 due to vibration of the vehicle.

When the second installation insertion 220 of the plate 200 is coupled to the first installation groove 121 of the caliper body assembly 100, the operator may couple the spacer 300 to the caliper body assembly 100 and the plate 200 using the fastener 400. As described above, the installation protrusion 121a of the first installation groove 121 may support the bottom of the second installation insertion 220 when the operator couples the spacer 300 to the caliper body assembly 100 and the plate 200 using the fastener 400. Therefore, the operator can easily couple the spacer 300 to the caliper body assembly 100 and the plate 200 without a separate device or worker to support the plate 200.

When the caliper body assembly 100, the plate 200 and the spacer 300 are coupled as one body, the coupling portions are not seen from outside, which makes it possible to improve the exterior quality of the caliper 1 for a vehicle body. Furthermore, although the fastener 400 is separated or loosened by vibration of the vehicle, the plate 200 can be prevented from separating from the caliper body assembly 100.

Hereafter, a caliper for a vehicle brake in accordance with a second embodiment of the present invention will be described. At this time, the detailed descriptions of the same components as those of the first embodiment are omitted herein.

The first installation groove 121 or the second installation insertion 220 may have a fastening groove 121c or 223 formed therein, and the second installation insertion 220 or the first installation groove 121 may have a fastening protrusion 224 or 121b which is inserted into the fastening groove 121c or 223. As illustrated in FIGS. 5 and 6, the first installation groove 121 may have the fastening protrusion 121b formed toward the second installation insertion 220, and the second installation insertion 220 may have the fastening groove 223 formed in the outer surface thereof, such that the fastening protrusion 121b is inserted into the fastening groove 223.

As illustrated in FIGS. 7 and 8, the second installation insertion 220 may have the fastening protrusion 224 formed toward the first installation groove 121, and the first installation groove 121 may have the fastening groove 121c into which the fastening protrusion 224 is inserted. The fastening protrusion 121b or 224 may be slid and coupled along the fastening groove 121c or 223.

As a result, when coupling the spacer 300 to the caliper body assembly 100 and the plate 200 using the fastener 400, an operator can easily couple the spacer 300 to the caliper body assembly 100 and the plate 200 because the caliper body assembly 100 and the plate 200 are coupled to each other. Furthermore, although the fastener 400 is separated or loosened by vibration of the vehicle or the like, the plate 200 can be prevented from separating from the caliper body assembly 100.

Hereafter, the operation and effect of the caliper 1 for a vehicle brake in accordance with the second embodiment of the present invention will be described with reference to FIGS. 5 and 8.

In order to couple the caliper body assembly 100, the plate 200 and the spacer 300 as one body, an operator may first couple the second installation insertion 220 of the plate 200 to the first installation groove 121 of the caliper body assembly 100.

Specifically, when the second installation insertion 220 of the plate 200 is coupled to the first installation groove 121 of the caliper body assembly 100, the fastening protrusion 121b or 224 formed on the first installation groove 121 or the second installation insertion 220 may be slid and coupled along the fastening groove 223 or 121c formed on the second installation insertion 220 or the first installation groove 121. At this time, since the maximum inner width W1 of the first installation groove 121 is equal to the maximum outer width W2 of the second installation insertion 220, no gap is formed between the first installation groove 121 and the second installation insertion 220. As a result, it is possible to prevent noise which may occur when the second installation insertion 220 is moved to collide with the first installation groove 121 due to vibration of the vehicle.

When the second installation insertion 220 of the plate 200 is coupled to the first installation groove 121 of the caliper body assembly 100, the operator may couple the spacer 300 to the caliper body assembly 100 and the plate 200 using the fastener 400. As described above, the first installation groove 121 of the caliper body assembly 100 and the second installation insertion 220 of the plate 200 may be already coupled to each other, when the operator couples the spacer 300 to the caliper body assembly 100 and the plate 200 using the fastener 400. Therefore, the operator can easily couple the spacer 300 to the caliper body assembly 100 and the plate 200 without a separate device or worker to support the plate 200.

When the caliper body assembly 100, the plate 200 and the spacer 300 are coupled as one body, the coupling portions are not seen from outside, which makes it possible to improve the exterior quality of the caliper 1 for a vehicle body. Furthermore, although the fastener 400 is separated or loosened by vibration of the vehicle, the plate 200 can be prevented from separating from the caliper body assembly 100.

In accordance with the embodiments of the present invention, when the caliper body assembly, the plate and the spacer are coupled through the caliper body assembly having the first installation groove formed therein and the plate having the second installation insertion coupled to the first installation groove, the coupling portions are not seen from outside. Therefore, the exterior quality of the caliper for a vehicle brake can be improved.

Furthermore, when the plate is coupled to the caliper body assembly, the installation protrusion formed on the first installation groove of the caliper body assembly may support the bottom of the second installation insertion of the plate. Therefore, when the spacer is coupled to the caliper body assembly and the plate through the fastener, the spacer can be easily coupled to the caliper body and the plate without a separate device or worker to support the plate.

Furthermore, since the plate is coupled to the caliper body assembly, the installation protrusion formed on the first installation groove of the caliper body assembly may support the bottom of the second installation insertion of the plate. Therefore, although the fastener is separated or loosened by vibration of the vehicle or the like, the plate can be prevented from separating from the caliper body assembly.

Furthermore, since the fastening protrusion formed on the first installation groove of the caliper body assembly or the second installation insertion of the plate is coupled to the fastening groove formed in the second installation insertion of the plate or the first installation groove of the caliper body assembly, the spacer can be easily coupled to the caliper body assembly and the plate without a separate device or worker to support the plate, when the spacer is coupled to the caliper body assembly and the plate through the fastener.

Furthermore, since the fastening protrusion formed on the first installation groove of the caliper body assembly or the second installation insertion of the plate is coupled to the fastening groove formed in the second installation insertion of the plate or the first installation groove of the caliper body assembly, the plate can be prevented from separating from the caliper body assembly, even though the fastener is separated or loosened by vibration of the vehicle or the like.

Furthermore, since the inner width of the first installation groove is equal to the outer width of the second installation insertion, it is possible to prevent noise which may occur when the plate is moved on the caliper body assembly by vibration of the vehicle or the like.

Although preferred embodiments of the invention have been disclosed for illustrative purposes, those skilled in the art will appreciate that various modifications, additions and substitutions are possible, without departing from the scope and spirit of the invention as defined in the accompanying claims.

What is claimed is:

1. A caliper for a vehicle brake, comprising:
   a caliper body assembly coupled to a torque cover comprising a friction pad installed therein, and the caliper body assembly further comprises a first installation part;
   a plate disposed to face the caliper body assembly, and comprising a second installation part coupled to the first installation part; and
   a spacer disposed between the caliper body assembly and the plate, maintaining a gap between the caliper body assembly and the plate using an elastic force,
   wherein:
   the caliper body assembly comprises:
      a caliper body coupled to the torque cover; and
      a first installation cover bent and extended from the caliper body to face the plate;
   the plate comprises:
      a plate body disposed to face the first installation cover; and
      the second installation part protruded from the plate body to be coupled to the first installation part;
   the first installation part comprises an installation protrusion formed toward an inside of the caliper body;
   a bottom of the second installation part contacts the installation protrusion;
   the caliper body assembly further comprises a coupling groove connected to the first installation part;
   the second installation part comprises a first coupling hole facing the coupling groove;
   the spacer comprises a second coupling hole facing the first coupling hole; and
   the caliper further comprises a fastener coupled to the coupling groove through the second coupling hole and the first coupling hole.

2. The caliper of claim 1,
   wherein the first installation cover comprises the first installation part to which the second installation part is coupled, and comprises the coupling groove connected to the first installation part.

3. The caliper of claim 1, wherein a maximum inner width of the first installation part is equal to a maximum outer width of the second installation part.

4. The caliper of claim 2, wherein one of the first installation part and the second installation part has a fastening groove formed therein, and
   the other of the first installation part and the second installation part has a fastening protrusion inserted into the fastening groove.

5. The caliper of claim 4, wherein the fastening protrusion is slid and coupled along the fastening groove.

* * * * *